May 3, 1966 W. A. HELBIG ETAL 3,249,746

DATA PROCESSING APPARATUS

Filed Oct. 17, 1961

INVENTORS
WALTER A. HELBIG &
WILLIAM E. WOODS
BY John V. Regan
Attorney 3,249,746

DATA PROCESSING APPARATUS

Walter A. Helbig, Woodland Hills, and William E. Woods, Northridge, Calif., assignors to Radio Corporation of America, a corporation of Delaware Filed Oct. 17, 1961, Ser. No. 145,594
9 Claims. (Cl. 235—175)

Figures 1, 2:
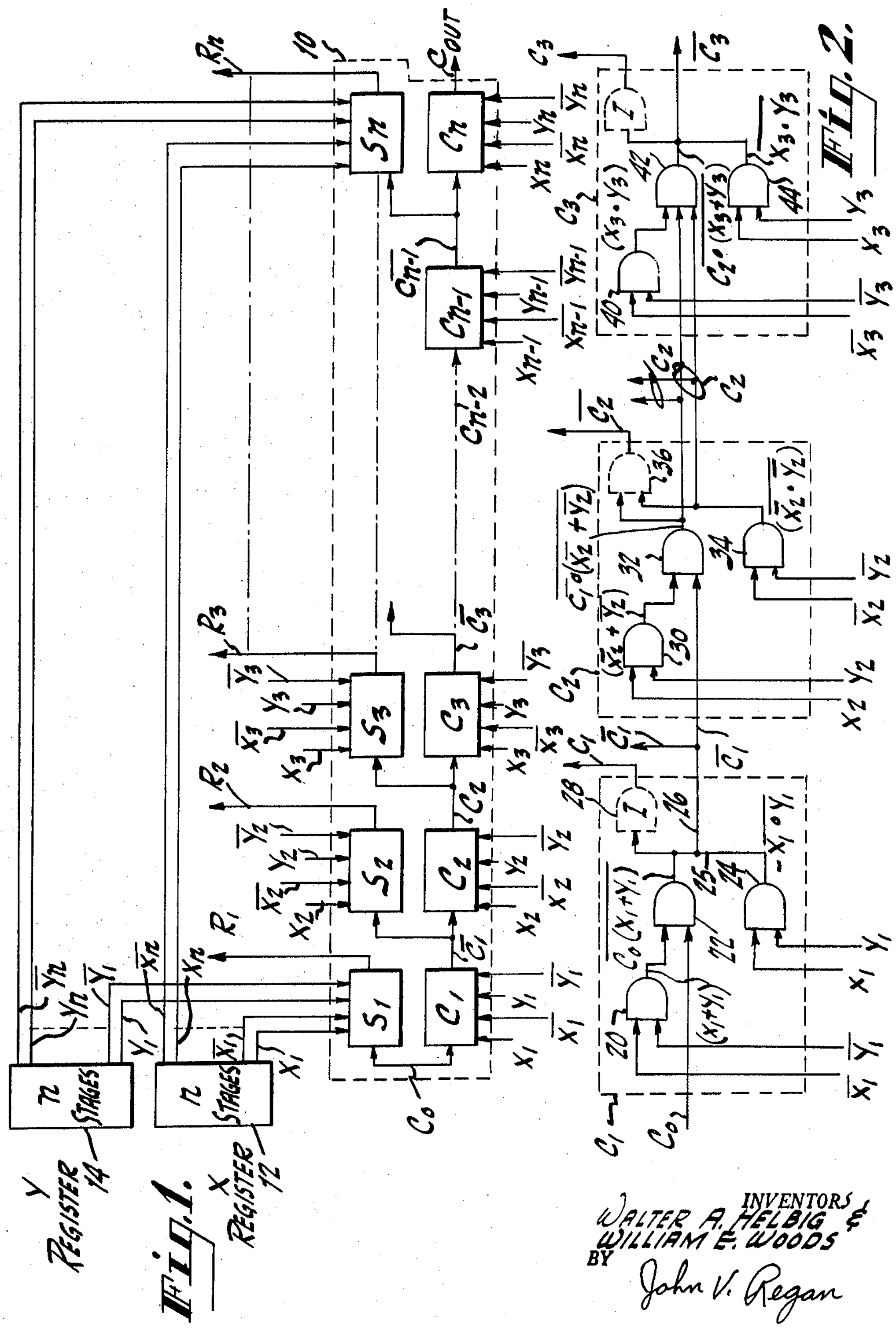

This invention relates to adder circuits, and particularly to high speed adder circuits.

Parallel binary adders are used to obtain higher speed operation than is possible with serial adders. Each pair of digits of like significance are added with a carry input signal in a separate adder stage to product a sum signal and a carry output signal. The carry signals propagate in serial fashion through the adder. This serial propagation appreciably delays the time required for addition even though all the addend and augend digits are simultaneously present.

It is common with parallel adders to employ carry ripple gates. An example of a high speed adder using carry ripple gates is described, for example, in chapter 4 of "Arithmetic Operations In Digital Computers," by R. K. Richards, published 1955 by D. Van Nostrand, Inc. The carry ripple gates function to transmit or not transmit a carry signal to the next higher adder stage depending upon the two augend and addend digits already present at the transmitting stage. Certain of the prior art ripple gates require an input carry signal to propagate through two or more gating circuits before the output carry signal is produced. Also, certain of the prior art ripple gates use four or more logic circuits to generate the carry signal. It is apparent that the adder speed can be markedly increased by decreasing the time required for a carry ripple gate to transmit a carry signal.

It is an object of the present invention to provide improved binary adders.

It is another object of the invention to provide improved carry ripple gates useful in adder circuits.

Another object of the invention is to provide improved carry ripple gates which transmit a carry signal with a reduced delay and which require a reduced number of logic circuits.

A binary adder, according to the invention, has a chain of carry ripple gates. Each carry ripple gate has three logic circuits. Two of the operand signals are applied to one logic circuit. The output of this circuit is combined with the carry signal from the preceding ripple gate in a second logic circuit. Complements of these two operand signals are applied to the third logic circuit. The carry output signal is provided by the two outputs respectively of the second and third circuits.

In alternate ones of the ripple gates the operand signals are applied to the first logic circuits and the complements of the operand signals are applied to the third circuits. In the other alternate ones of the gates the complements of the operand signals are applied to the first circuits and the operand signals to the third circuits. As the carry signal propagates through the chain of ripple gates, its level is alternately changed from a relatively high to a relatively low value. Such a carry circuit arrangement permits the carry signal to propagate at a maximum speed using a minimum of logic circuitry.

A feature of this invention is that the carry signal from the alternate ones of the carry ripple gates can be transmitted via a single lead.

In the accompanying drawing,

FIG. 1 is a block diagram of an $n$ stage adder arranged according to the invention; and FIG. 2 is a more detailed diagram of a sequence of the carry ripple gates of the adder of FIG. 1.

The adder 10 of FIG. 1 is indicated as having $n$ stages where $n$ is any desired number, usually equal to the word length in the system using the adder. The first three sum stages $S_1$ through $S_3$ and the final sum stage $S_n$ are indicated by blocks. The dashed-dot line between stages $S_3$ and $S_n$ is used to indicate the intermediate sum stages $S_4$ through $S_{n-1}$ not shown. The sum stages receive addend and augend binary numbers from any suitable source, for example from an $n$ stage X register 12 and an $n$ stage Y register 14. The registers 12 and 14 may be conventional flip-flop registers. Each flip-flop has two stable states set and reset and provides two corresponding outputs X and $\overline{X}$ (not X), respectively. The numeral following the letter X or Y indicates the order of the digit within the word. The least significant digit is assumed to be $X_1$ (or $Y_1$) and the most signicant digit is $X_n$ (or $Y_n$). When an X flip-flop output is at one level, say low, the $\overline{X}$ output associated with it is at a relatively high level, and vice versa. The Y register 14 is similarly arranged. The low level is arbitrarily assumed herein to represent a binary "1" and the high level a binary "0."

The X and Y binary numbers are applied to the registers 12 and 14 from any suitable source (not shown) and are stored in these registers. Like-significance stages 1 through $n$ of the X and Y registers are connected to corresponding ones of the sum stages $S_1$ through $S_n$ of the adder 10. Both the unbarred and barred outputs of each register flip-flop are used.

The adder 10 has also a chain of carry ripple gates $C_1$ through $C_n$ each of which receives corresponding outputs 1 through $n$ of the X and Y registers. The intermediate carry ripple gates between $C_3$ and $C_{n-1}$ are indicated by the dashed-dot line.

The first sum stage $S_1$ and the first carry stage $C_1$ are shown as receiving an input carry signal $C_0$. The signal $C_0$ is used in certain complementing type operations as, for example, when the adding unit is used to perform a binary subtraction operation using "twos" complementing. In such case, one of the X or Y numbers is complemented and this number and the other of the two numbers are added together in normal fashion. The initial carry signal $C_0$ normally is at a one level during an addition operation. During a subtraction operation using "twos" complementing, the $C_0$ signal is changed to the opposite level in order to change the complemented operand number from the "ones" complemented form to the desired "twos" complemented form. The $C_0$ operate signal need not be used where "ones" complementing type subtraction is used, for example, when additional time is permitted to complement the "ones" complemented sum to obtain the correct sum. Descriptions of the use of binary adders in "ones" complementing type subtraction operations are provided at pages 525, 526 of a textbook by Ledley, entitled "Electronic Design Of Digital Circuits," published by McGraw-Hill, 1960. A textbook by Grabbe, Ramo and Wooldridge, entitled "Handbook of Automation Computation and Control," vol. 2, pages 18–14 through 18–16, published by John Wiley and Sons, Inc., 1950, describes "twos" type complementing for binary subtractors.

The output of the carry ripple gate $C_1$ is applied to the succeeding carry ripple gate $C_2$ and to the next higher order sum gate $S_2$, and so on for each carry ripple gate. The output of carry ripple gate $C_{n-1}$ is applied to the final sum circuit $S_n$. The final carry ripple gate $C_n$ is used to obtain an output carry $C_{OUT}$ which in practice is used for various purposes not pertinent to the present invention. For example, $C_{OUT}$ may be used to generate an alarm signal to indicate that the capacity of the adder has been exceeded.

Each of the sum gates $S_1$ through $S_n$ may be of conventional type such as that described in chapter 16, pages 16–11 through 16–14 of the above referenced Grabbe et al. text. It should be noted, however, that there is no requirement for generating a carry signal in the sum circuits themselves since this is performed in the present invention by the carry ripple gates. Thus, the circuit of FIG. 9 of the reference would not require the upper transistors of the first two columns beginning at the left side of the drawing. Other suitable sum circuits may be employed as desired. However, it is preferred that the sum circuits be of the transistor type so that no level shifting will be required between the carry ripple gates and the sum circuits.

In the carry ripple chain, odd numbered ones of the carry ripple gates produce an inverse carry output signal, for example, $\overline{C_1}$, $\overline{C_3}$ and so forth, and even numbered ones of the carry ripple gates provide carry signals, for example, $C_2$, $C_4$ and so on.

A more detailed schematic diagram of the first three carry ripple gates of the chain is shown in FIG. 2. The first carry ripple gate $C_1$ includes a first circuit 20 which receives the $\overline{X_1}$, $\overline{Y_1}$ inputs. A second circuit 22 receives the output of the first circuit 20 and the initial carry signal $C_0$. A third circuit 24 receives the $X_1$, $Y_1$ inputs. The outputs of the second and third circuits 22, 24 are directly connected to each other and provide a not carry output $\overline{C_1}$ on the carry output line 26. The not carry output $\overline{C_1}$ is applied to the first sum stage $S_2$ and to the input of the second carry ripple gate $C_2$. A true carry output $C_1$ can be obtained, if desired, by an inverter 28, shown dotted, which is connected to carry line 26 to change the $\overline{C_1}$ (not carry) signal to the $C_1$ (carry) signal. The carry signal $C_1$ and its complement $\overline{C_1}$ are used in the sum stage $S_2$ in obtaining the sum signal $S_2$, in the manner described, for example, in the above referenced Grabbe, Ramo and Wooldridge textbook. The inverter 28, as a practical matter, may be incorporated in the sum stage.

Each of the logic circuits used herein is one which produces one output level, say high, when and only when all its input signals are at the opposite or low level. The high level is interpreted herein as a binary zero and the low level as a binary one. When any one of the inputs is a binary "0," a high level, the logic circuit produces a low level output representing a binary "1." That is, the function of each of the logic circuits may be expressed according to either one of the following equations, where F is the output and A, B, and C are the inputs.

$$F=\overline{A.B.C} \tag{1}$$

or $$F=\overline{A}+\overline{B}+\overline{C} \tag{2}$$

When less than three inputs are used, the missing inputs are interpreted as logical "ones." In Equations 1 and 2 and the other equations later described, the period (.) is used to designate the logical product and the plus sign (+) the logical sum. Any suitable devices may be used to implement the logic circuit. However, a diode transistor arrangement is preferred in the present case because of the transistor amplification and operating speed.

An inverter circuit is one which receives an input signal and provides the complement of that signal at its output. A suitable inverter may be a transistor amplifier which has the input connected to its base and the output connected to its collector. Descriptions of suitable diode-transistor gating circuits and inverters are also provided in the above referenced text by Ledley, particularly chapter 20.

The carry gate $C_1$ implements the following equation, where $n$ is equal to 1.

$$\overline{C_n}=\overline{A_n.B_n}.\overline{C_{n-1}(A_n+B_n)} \tag{3}$$

The outputs of the three gating circuits 20, 22 and 24 are identified to show their correspondence with the various terms of Equation 3. It can be shown, as by drawing tables, that Equation 3 is equal to $$\overline{C_n}=\overline{C_{n-1}.(A_n+B_n)+(A_n.B_n)} \tag{4}$$

Thus, the outputs of the gates 22 and 24 together produce an output signal $\overline{C_1}$ which is the inverse of the carry signal $C_1$.

It should be noted that the $\overline{C_1}$ output can be obtained by directly connecting the outputs of the two circuits 22 and 24 at junction point 25. This direct connection is permitted since when either of the gates 22 or 24 produces a zero output the junction point 25 assumes the zero output level and when both gates 22 and 24 produce a one output the junction point 25 assumes the one output level. This direct connection results in a more economical and simple circuit since no logic circuit need be used to implement the "and" operation implied by the period connecting the two terms of Equation 3. However, in certain systems it may be desirable to have one or the other of the terms of Equation 3 available for further logical operations not pertinent here, and in such case the $\overline{C_1}$ output then is taken via two separate leads instead of the single lead.

The carry ripple gate $C_2$ has three logic circuits 30, 32 and 34. The first circuit 30 receives the $X_2$, $Y_2$ operand inputs and provides an output to the second circuit 32. The second circuit 32 also receives the not carry signal $\overline{C_1}$. The third circuit 34 receives the complements $\overline{X_2}$ and $\overline{Y_2}$ of the operand signals. The outputs of the second and third circuits 32 and 34 together provide the $C_2$ carry signal. The second carry ripple gate $C_2$ implements Equation 5 below, where $n$ is equal to 2.

$$C_n=\overline{\overline{C_{n-1}}.(\overline{X}_n+\overline{Y}_n)+(\overline{X}_n.\overline{Y}_n)} \tag{5}$$

It can be shown that Equation 5 reduces to $$C_n=C_{n-1}(X_n+Y_n)+(X_n\cdot Y_n) \tag{6}$$

which defines the carry signal from a binary adder having two operand inputs $X_n$, $Y_n$ and a carry input signal $C_{n-1}$. It should be noted that the two outputs defining $C_2$ could have been directly combined at a junction point as in the case of carry signal $\overline{C_1}$. This direct combining is permitted since the output $C_2$ is required to produce a one output only when both of the gates 32 and 34 produce a one output.

The third carry ripple gate $C_3$ is similar to carry ripple gate $C_1$ except that the second logic circuit 42 has three inputs, two of which receive the $C_2$ output of the carry ripple gate $C_2$, and the third of which receives the output of the first logic circuit 40. The three-input circuit 42 of the carry ripple gate $C_3$ performs the "or" function implied in the plus sign between the two terms of Equation 6 to obtain the carry signal $C_2$. At the same time, the second circuit 42 combines the output of the first circuit 40 to obtain the second term of Equation 3 above where $n$ now is equal to 3. Thus, it is seen that the odd numbered carry ripple gates implement carry Equation 3 above, and the even numbered carry ripple gates implement Equation 6 above.

In operation, the $X_1$ through $X_n$ and $Y_1$ through $Y_n$ signals representing the two operands X and Y are already present. The $C_0$ signal may be in the form of an operate signal which is normally at a low level representing a binary "1" during a binary addition operation, and normally at a high level representing a binary "0" during a binary subtraction operation. It should be noted that each carry ripple gate requires that the input carry signal be transmitted through only one logic circuit before being applied to the next carry ripple gate. In the "worst case," then, the carry signal need propagate through only $(n-1)$ gating circuits. Also, in the worst case, the adder output represented by signals $R_1$ through $R_n$ are available after $(n-1)$ gate circuit delays plus the additional time required to form the final sum $R_n$ in the sum stage $S_n$.

What is claimed is:

1. A high speed carry circuit comprising a chain of carry ripple gates, each said gate comprising three logic circuits each said circuit having inputs and an output, means for applying operand signals and their complements and a carry signal to each of said gates, said operand signals being applied to a first of said circuits of alternate ones of said gates and to a third of said circuits of the other alternate ones of said gates, the output of said third circuits and said carry input signal being applied to the second of said circuits in each said gate, and the outputs of said second and first circuits together providing an output carry signal.

2. A high speed carry network as claimed in claim 1, wherein the outputs of said second and first circuits of the said alternate gates are directly connected to each other.

3. A high speed carry circuit comprising a chain of carry ripple gates each having inputs for receiving both operand signals A, B and their complements $\overline{A}$, $\overline{B}$ and the carry signal from the preceding gate and an output for providing a carry signal to a succeeding gate, odd numbered ones of the carry ripple gates consisting of three logic circuits arranged to implement the logical expression $\overline{C\cdot(A+B)+A\cdot B}$, and the other alternate ones of said gates consisting of three logic circuits arranged to implement the logical expression $C(A+B)+(A\cdot B)$, where A and B represent the operand signals and C represents the input carry signal.

4. A high speed adder comprising $n$ separate sum stages each arranged for combining two operand digits of like significance and a next least significant carry digit to produce a sum signal, and $n-1$ carry ripple gates connected in series with each other least significant to most significant for transmitting a received carry signal to the next higher order gate and to the next higher order sum stage or for generating a new carry signal in accordance with said applied operand signals, alternate ones of said carry gates producing one polarity signal representing the presence of a carry signal and the other alternate ones of said carry gates producing another different signal representing the inverse of a carry signal said alternate gates including a first logic circuit for combining operand signals, a second logic circuit for combining the complements of said operand signals, and a third logic circuit for combining the output of said first circuit with said inverse carry signal, and said other alternate carry gates including a first logic circuit for combining the complements of said operand signals, a second logic circuit for combining said operand signals and a third logic circuit for combining the output of said first circuit with a received carry signal, the outputs of both said gates providing said transmitted carry signal or generating said new carry signal.

5. A high speed adder as claimed in claim 4, including an additional carry gate for combining signals representing the $n$th operand digits and the $n-1$ carry signal and providing a carry output signal, where $n$ represents the most significant digit of said adder.

6. A high speed adder according to claim 4, including means for applying an initial carry signal to the least significant sum stage and to the least significant carry ripple gate.

7. In a binary computer having a plurality of stages connected in cascade, carry propagation circuitry including means in each of said stages for producing a pair of carry output signals which are applied to the next successive stage as carry input signals, the carry output signals at every other stage of the computer being adapted to produce a carry input to the next successive stage when they are both of the same binary state, the carry output signals of the remaining stages in the computer being such that they will produce a carry input to the next succeeding stage when they are of opposite binary states, and single logic elements interposed between the input and output carry signals for each stage each said logic element being one which produces an output signal of one level when and only when its input signals are at the opposite level.

8. A binary computer comprising a plurality of stages connected in cascade with each of said stages having an input signal A and an input signal B applied thereto, first means in each of said stages for producing an Off binary control signal whenever one or both of said input signals A and B are On, second means in each of said stages for producing an On binary control signal when both of the input signals A and B are On, a logic circuit element in each of said stages having its input connected to the output of the corresponding logic element in the preceding stage and its output connected to the input of the corresponding logic element in the succeeding stage, means for applying one of said binary control signals in each stage to the input of the aforesaid logic element for that stage, and means for applying the other of said binary control signals in each stage to the input of the logic element in the succeeding stage, the arrangement being such that the two signals applied to the logic element in each stage constitute carry input signals each said logic element being one which produces an output signal of one level when and only when its input signals are at the opposite level.

9. A binary computer comprising a plurality of stages connected in cascade with each of said stages having an input signal A and an input signal B applied thereto, first means in each of said stages for producing an Off binary control signal whenever one or both of said input signals A and B are On, second means in each of said stages for producing an On binary control signal when both of the input signals A and B are On, a logic circuit element in each of said stages having its input connected to the output of the corresponding logic element in the preceding stage and its output connected to the input of the corresponding logic element in the succeeding stage, means for applying the binary control signal produced by said first means in every other stage of the computer to the input of the aforesaid logic element for the stage, means for applying the binary control signal produced by said second means in said every other stage to the input of the logic element in the succeeding stage, means for applying the binary control signal produced by said first means in the remaining stages to the input of the logic element in the succeeding stage, and means for applying the binary control signal produced by said second means in the said remaining stages to the input of the aforesaid logic elements for those stages, the arrangement being such that the two signals applied to the logic element in each stage constitute carry input signals wherein a carry input is produced in every other stage when both of the input signals are Off whereas a carry input is product in the remaining stages when one of the carry input signals is On each said logic element being one which produces an output signal of one level when and only when its input signals are at the opposite level.

References Cited by the Examiner

UNITED STATES PATENTS

| | | | |
|---|---|---|---|
| 2,879,001 | 3/1959 | Weinberger et al. | 235—175 |
| 2,988,277 | 6/1961 | Yamada | 235—175 |

ROBERT C. BAILEY, *Primary Examiner.*

WALTER W. BURNS, Jr., MALCOLM A. MORRISON, *Examiners.*

P. J. HENON, *Assistant Examiner.*